(No Model.)
F. E. YOUNGS.
PROPORTIONAL METER.
No. 473,545. Patented Apr. 26, 1892.
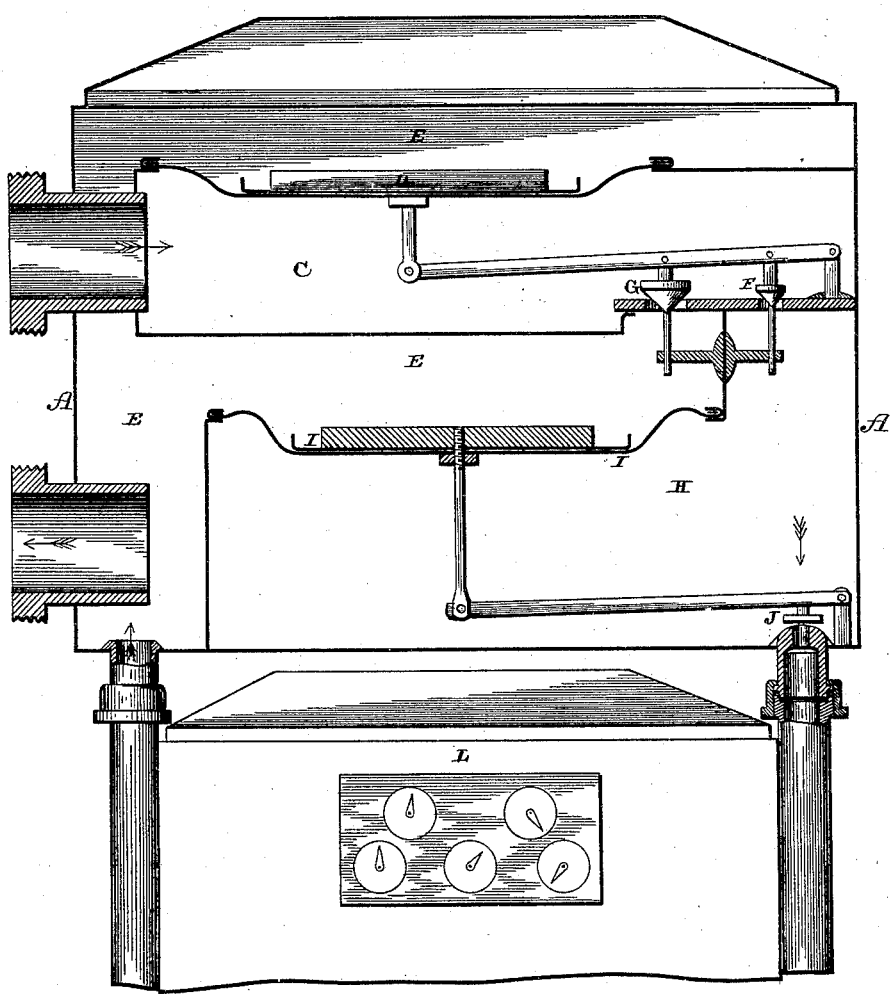
Witnesses:
E. P. Ellis,
A. Stevens Pattison
Inventor:
F. E. Youngs,
per F. A. Lehmann,
Atty

UNITED STATES PATENT OFFICE.

FRED E. YOUNGS, OF PITTSBURG, PENNSYLVANIA.

PROPORTIONAL METER.

SPECIFICATION forming part of Letters Patent No. 473,545, dated April 26, 1892.

Application filed February 8, 1890. Serial No. 339,666. (No model.)

*To all whom it may concern:*

Be it known that I, FRED ELLIOTT YOUNGS, of Pittsburg, in the county of Allegheny and State of Pennsylvania, have invented certain new and useful Improvements in Proportional Meters; and I do hereby declare the following to be a full, clear, and exact description of the invention, such as will enable others skilled in the art to which it pertains to make and use it, reference being had to the accompanying drawing, which forms part of this specification.

My invention relates to an improvement in proportional meters; and it consists in the combination of the inclosing case, an inlet-chamber, a weighted diaphragm, which operates a valve mechanism placed in the inlet-chamber, an outlet-chamber, a feeding-chamber, a weighted diaphragm, which forms a portion of the top of the feeding-chamber and which operates a valve placed in the feeding-chamber and which controls the flow of gas from the feeding-chamber to the tally-meter, as will be more fully described hereinafter.

The object of my invention is to provide a proportional meter which will accurately maintain the ratio between the measured and unmeasured portions of the gas without regard to changes of pressure or changes of volume or amount of flow, of course within the limits of the capacity of the meter, and which will absorb but a very small amount of flowing pressure of the gas or fluid.

The accompanying drawing represents a vertical section of a meter which embodies my invention.

A represents a suitable inclosing case of any form, shape, or construction that may be desired. The gas enters at the inlet-chamber C and bears upward against the under side of the weighted diaphragm D, which forms a portion of the partition between the inlet-chamber C and the outlet-chamber E. This weighted diaphragm acts by the lifting pressure of the gas in the chamber C to open the proportional valves F G, so as to allow a portion of the gas from the chamber C to pass into the outlet-chamber E at the same time that another portion of the gas is allowed to pass from the chamber C into the feeding-chamber H. The pressure of the gas in the chamber C, acting upon the lower side of the weighted diaphragm D, has a tendency to raise the diaphragm and open the proportional valves F G. This upward motion is counteracted or balanced by both the pressure of the gas in the chamber E and the weight on the diaphragm D, the result being a constant difference or fall in pressure between the chambers C and E.

At the same time that the lifting motion of the weighted diaphragm D controls the passage of the gas from the inlet-chamber C to the outlet-chamber E it also controls the passage of the gas from the chamber C to the feeding-chamber H. Where the pressure of the gas accumulates to such an extent as to raise the weighted diaphragm I, and thus operate the valve J, so as to allow the gas to pass from the chamber H into the tally-meter L, the weight on the diaphragm I is so adjusted that the pressure in the chamber H is constantly kept higher than the pressure in the chamber E. In other words, the fall or drop in pressure of the gas in flowing from the chamber C into the chamber H through the valve F is less than the fall or drop in pressure of the gas in flowing from the chamber C into the chamber E. The portion of the gas to be measured flows from the chamber H through the valve J and tally-meter L to the outlet-chamber E, where it mingles with the unmeasured portion of the gas. By thus adjusting the weight on the diaphragm, so as to cause a less fall of pressure in flowing from the inlet-chamber C through the small opening F of the proportional valve than there is in flowing from the inlet-chamber C through the large opening of the proportional valve into the chamber E, the area of the small opening of the proportional valve may be made larger than it could be in case the fall in pressure through the two openings of the proportional valve was the same.

In constructing proportional meters it is found difficult to maintain accurately the ratio between the flow of the gas through the two openings of the proportional valve, especially when the total flow through the meter is small. The area then of the small opening of the proportional valve becomes so small that a very minute error in the shape of this opening has a very large effect on the ratio of the measured portion of the gas to the unmeasured portion of the gas. By this construction the small opening of the valve may be made considerably larger, so that any ordinary error in shaping the valve will have a correspondingly-less effect on the ratio of the gas passing through the two openings of the valve.

Having thus described my invention, I claim—

1. In a proportional meter, the combination of an inlet-chamber, an outlet-chamber, a meter-feeding chamber, through which a portion of the gas passes to be measured, a tally-meter, proportional valves, and a weighted diaphragm which operates them, a valve for controlling the flow from the feeding-chamber to the tally-meter, and a weighted diaphragm which operates it, substantially as shown and described.

2. In a proportional meter, the combination of an inlet-chamber, an outlet-chamber, proportional valves, a weighted diaphragm placed between the inlet and outlet chambers, which operates the proportional valves, a meter-feeding chamber, a tally-meter, a valve placed between the meter-feeding chamber and the tally-meter, and a weighted diaphragm placed between the meter-feeding chamber and the outlet-chamber for operating it, all combined to operate in the manner substantially as specified.

In testimony whereof I affix my signature in presence of two witnesses.

FRED E. YOUNGS.

Witnesses:
F. A. LEHMANN,
H. J. ENNIS.